United States Patent
Li

(10) Patent No.: US 9,958,950 B2
(45) Date of Patent: May 1, 2018

(54) DETECTOR

(71) Applicant: NXP B.V., Eindhoven (NL)

(72) Inventor: Min Li, Leuven (BE)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/224,860

(22) Filed: Aug. 1, 2016

(65) Prior Publication Data

US 2017/0052596 A1 Feb. 23, 2017

(30) Foreign Application Priority Data

Aug. 19, 2015 (EP) .................................... 15181574

(51) Int. Cl.
*G06F 3/043* (2006.01)
*G06F 3/01* (2006.01)
(Continued)

(52) U.S. Cl.
CPC ............ *G06F 3/017* (2013.01); *G01S 7/5273* (2013.01); *G01S 7/539* (2013.01); *G01S 15/58* (2013.01);
(Continued)

(58) Field of Classification Search
CPC ...... G06F 1/3287; G06F 1/3206; G06F 3/017; G01S 7/5273
(Continued)

(56) References Cited

U.S. PATENT DOCUMENTS 9,354,709 B1 * 5/2016 Heller ..................... G06F 3/017
2010/0202656 A1 8/2010 Ramakrishnan et al.
(Continued)

FOREIGN PATENT DOCUMENTS

EP 2852057 A1 3/2015
WO WO-2012/017241 A1 2/2012
(Continued)

OTHER PUBLICATIONS

Dura-Bernal, Salvador et al; "Human action categorization using ultrasound micro-Doppler signatures"; International Workshop on Human Behavior Understanding; Springer Berlin Heidelberg; 10 pages (Nov. 16, 2011).
Extended European Search Report for Patent Appln. No. 15181574.3 (dated Feb. 9, 2016).
Gupta, Sidhant et al; "SoundWave: Using the Doppler Effect to Sense Gestures"; Microsoft Research, Redmond, WA US; Presented CHI 2012, Austin, TX US; 4 pages (2012).
(Continued)

*Primary Examiner* — Abdul-Samad A Adediran

(57) ABSTRACT

A user input detector for a mobile device is described having an ultrasound demodulator having an input for receiving an ultrasound signal reflected from a user and an output for outputting a demodulated ultrasound signal; a gesture processor comprising: a time-frequency processing module configured to generate a time-varying ultrasound-image spectrum from the demodulated ultrasound signal; an image-feature extraction module configured to extract micro-doppler features from the time-varying ultrasound image spectrum; a feature selection module configured to select and compress the extracted micro-doppler features; and a gesture detection module configured to compare the selected micro-doppler features with a known feature set and to output a detected gesture based on the comparison. The user input detector may be incorporated into a mobile phone for example to provide an always on low power control mechanism for the mobile phone by recognizing user gestures and executing control commands in response to those user gestures.

14 Claims, 3 Drawing Sheets

(51) Int. Cl.

| | |
|---|---|
| *G06F 1/32* | (2006.01) |
| *G01S 7/527* | (2006.01) |
| *G01S 15/58* | (2006.01) |
| *G06F 3/03* | (2006.01) |
| *G06F 3/16* | (2006.01) |
| *G01S 7/539* | (2006.01) |
| *G01S 15/88* | (2006.01) |
| *G06T 7/00* | (2017.01) |
| *G06T 7/73* | (2017.01) |
| *G06K 9/00* | (2006.01) |
| *G06F 3/0346* | (2013.01) |

(52) U.S. Cl.
CPC ............ *G01S 15/88* (2013.01); *G06F 1/3287* (2013.01); *G06F 3/03* (2013.01); *G06F 3/0346* (2013.01); *G06F 3/16* (2013.01); *G06K 9/00355* (2013.01); *G06T 7/74* (2017.01); *G06T 7/97* (2017.01); *G06T 2207/10132* (2013.01)

(58) Field of Classification Search
USPC ............ 1/1; 340/4.11; 345/173, 177; 348/77
See application file for complete search history.

(56) References Cited

U.S. PATENT DOCUMENTS

| | | | | |
|---|---|---|---|---|
| 2012/0001875 | A1* | 1/2012 | Li | ........................ G01S 7/5273 345/177 |
| 2013/0154919 | A1 | 6/2013 | Tan et al. | |
| 2013/0229508 | A1* | 9/2013 | Li | ........................ G06F 1/3287 348/77 |
| 2014/0092031 | A1* | 4/2014 | Schwartz | ............. G06F 1/3206 345/173 |
| 2014/0142816 | A1 | 5/2014 | Moebus | |
| 2016/0125705 | A1* | 5/2016 | Hurtig | .................... G06F 3/017 340/4.11 |

FOREIGN PATENT DOCUMENTS

| | | |
|---|---|---|
| WO | WO-2013/096023 A1 | 6/2013 |
| WO | WO-2015/054419 A1 | 4/2015 |

OTHER PUBLICATIONS

Qifan, Yang et al; "Dolphin: Ultrasonic-Based Gesture Recognition on Smartphone Platform"; 2014 IEEE 17th IInternational Conference on computational Science and Engineering; pp. 1461-1468 (2014).

Raj, Bhiksha et al; Ultrasonic Doppler Sensing in HCI; IEEE Pervasive Computing, IEEE Service Center, Los Alamitos, CA, US, vol. 11, No. 2; pp. 24-29; (Feb. 2012).

Wan, Qian et al; "Gesture Recognition for Smart Home Applications using Portable Radar Sensors"; IEEE 36 Annual conference of the IEEE Engineering in Medicine and Biology Society, Chicago, IL, US; pp. 6414-6417 (Aug. 26-30, 2014.

* cited by examiner

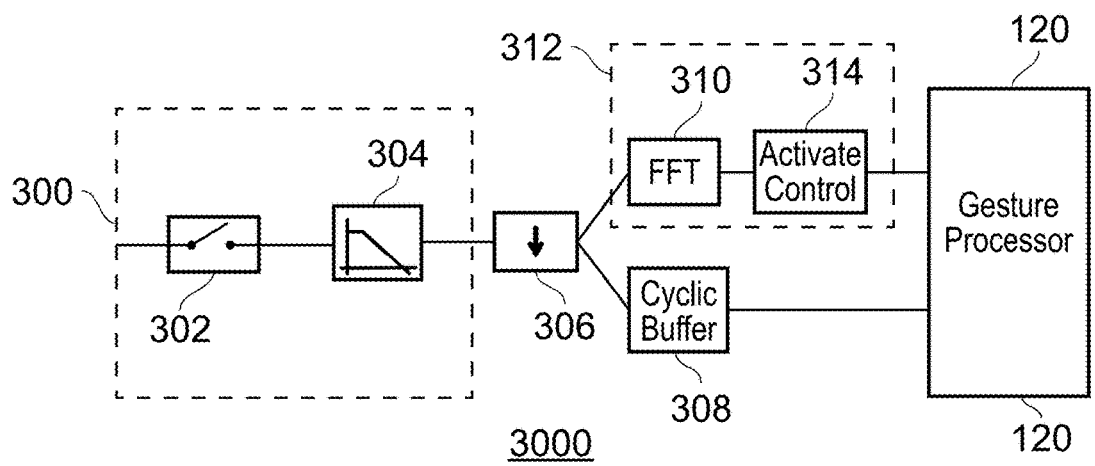
FIG. 3
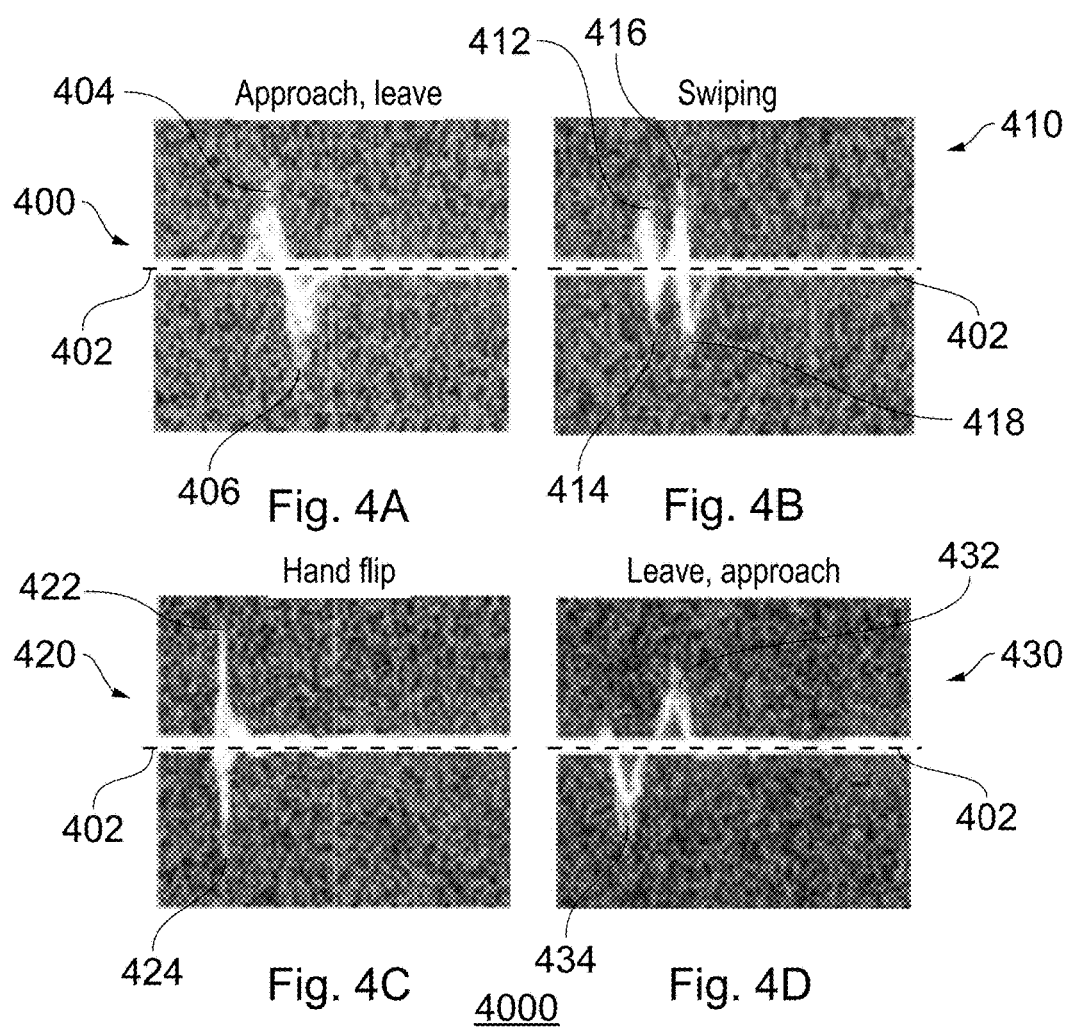
Fig. 4A
Fig. 4B
Fig. 4C
Fig. 4D

DETECTOR

CROSS-REFERENCE TO RELATED APPLICATIONS

This application claims the priority under 35 U.S.C. § 119 of European patent application no. 15181574.3, filed Aug. 19, 2015 the contents of which are incorporated by reference herein.

FIELD

This disclosure relates to a detector for a user input to a mobile device.

BACKGROUND

Smart mobile devices such as mobile phones have a variety of user input methods for controlling the device, in particular tapping a screen or button or speech recognition. The in-air gesture has long been recognized as a very attractive alternative due to its unique intuitiveness, richness and convenience. However in air gesture recognition technologies which recognize complex gestures, for example based on cameras, require processing of continuous video frames, in addition to the fact that image sensors are generally not low power components. Camera-based solutions may require good illumination to work correctly and may be sensitive to light disturbance.

Moreover, other systems for example optical sensors, near field sensors and capacitive sensors may not recognize complex gestures, whether predetermined or user-defined.

SUMMARY

Various aspects are defined in the accompanying claims. In a first aspect there is defined a detector for a user input to a mobile device comprising: an ultrasound demodulator having an input for receiving an ultrasound signal reflected from a user and an output for outputting a demodulated ultrasound signal; a gesture processor comprising: a time-frequency processing module configured to generate a time-varying ultrasound-image spectrum from the demodulated ultrasound signal; an image-feature extraction module configured to extract micro-doppler features from the time-varying ultrasound image spectrum; a feature selection module configured to select and compress the extracted micro-doppler features; and a gesture detection module configured to compare the selected micro-doppler features with a known feature set and to output a detected gesture based on the comparison.

The detector allows complex in-air gestures to be recognized using ultrasound and used to control a mobile device such as a mobile phone or smart phone for example. The demodulation of the input signal allows the gesture information which is contained in or carried in a narrow band signal of a few Kilohertz to be extracted without sampling the full bandwidth of the signal when converting the signal between analog and digital domains. By demodulating the signal, the power consumption of the gesture detection may be reduced and enable the in-air gesture as an "always-on" feature when include in smart devices such as smart phones.

Extracting micro-doppler features may allow the compound movements to be detected with ultrasound, going beyond simply detecting the direction and speed of hand movement for example. Since sub-parts of human hands/arms have different movement characteristics when making complex gestures, the different components may be used to generate user specific signatures and recognize more complex gestures.

A large number of image features from the reflected signal may be extracted for further processing. Hence, much more information associated with gestures may be derived including but not limited to the sequencing of hand movements; timing of sequenced hand movements; maximum speed and relative speed of movements; acceleration of hand movements; duration of hand movements; and repetitive pattern of hand movements.

In embodiments of the detector, the ultrasound demodulator may comprise a switch arranged between the ultrasound signal input and the demodulated ultrasound signal output and wherein the ultrasound demodulator is operable to switchably couple the ultrasound signal to the demodulated ultrasound signal output.

The switch may be operated at a similar or the same frequency as the transmitted ultrasound signal In embodiments of the detector the ultrasound demodulator may comprise a low-pass filter arranged between the switch and the demodulated ultrasound signal output.

In embodiments, the detector may comprise a down-sampler coupled to the demodulated ultrasound signal output.

In embodiments the detector may comprise a cyclic buffer arranged between the output of the ultrasound demodulator and the gesture processor.

In embodiments the detector of any preceding claim may comprise a fast fourier transform (FFT) module arranged between the down-sampler and the gesture processor. The FFT module may be implemented in low bit width circuitry, for example between 4 to 8 bits which results in a simpler module with lower power consumption.

In embodiments, the detector may further comprise an activation controller arranged between the ultrasound demodulator and the gesture detection module, wherein the activation controller is operable to determine a candidate gesture by comparing the demodulated ultrasound signal with a predetermined threshold value, and to enable the gesture processor in response to a candidate gesture being detected.

The activation controller may reduce the power consumption of the detector by only activating the gesture processor when a possible candidate gesture has been detected. This may allow the gesture detector to operate in an "always on" mode.

Embodiments of the detector may be included in a mobile device and further configured to execute a user command in response to the detected gesture. Example user commands may include but are not limited to commands which mute and/or unmute audio, to lock and/or unlock the mobile device, or change the volume of an audio playback. A mobile phone including the detector may be able to respond to user gestures at a distance of up to 1 meter or more from the mobile phone. A mobile phone including the detector may be controllable while for example in the pocket of a user of the phone.

In embodiments a mobile device may comprise a speaker coupled to an ultrasound signal generator and a microphone coupled to the detector wherein the mobile device is configured to transmit an ultrasound signal and to detect a reflected ultrasound signal.

When incorporated in a mobile device, existing speakers and microphones may be used in combination with the detector to implement a system for gesture detection which may be used to control the mobile device. The system may be operable in a standby mode of operation and be in an "always on" mode when other user input devices or user interfaces, for example a touch screen of a smartphone, are disabled. In embodiments the loudspeaker or other acoustic transducer may be used both to transmit the ultrasound signal and detect any reflected response. The transmitted ultrasound signal may be a continuous single frequency tone or a single frequency pulse with silent intervals in between. Embodiments may detect complex in-air gestures with a single speaker-microphone pair.

Embodiments of the mobile device may include a mobile phone or smart phone, a tablet computer, a PDA, a portable audio player and a wearable device.

In a second aspect there is described a method of controlling a mobile device, the method comprising: transmitting an ultrasound signal; demodulating a reflected ultrasound signal from a user; generating a time-varying ultrasound-image spectrum from the demodulated ultrasound signal; extracting micro-doppler features from the time-varying ultrasound image spectrum; selecting and compressing the extracted micro-doppler features; comparing the selected micro-doppler features with a known feature set; and outputting the detected gesture based on the comparison.

In embodiments demodulating the reflected ultrasound signal comprises switching the reflected ultrasound signal.

In embodiments demodulating the reflected ultrasound signal further comprises low-pass filtering the reflected ultrasound signal.

In embodiments, the step of generating a time-varying ultrasound-image spectrum only occurs when a candidate gesture had been detected.

In embodiments the reflected ultrasound signal may be down-sampled.

BRIEF DESCRIPTION OF DRAWINGS

In the figures and description like reference numerals refer to like features. Embodiments of the invention are now described in detail, by way of example only, illustrated by the accompanying drawings in which:

FIG. 3 shows a detector for a user input according to an embodiment.

FIG. 4A, FIG. 4B, FIG. 4C and FIG. 4D show example detector responses to different user inputs.

DESCRIPTION

Figure 1A:
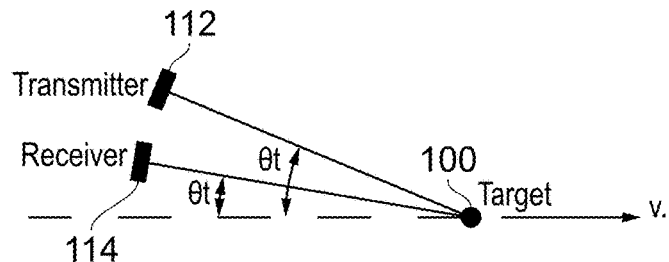
FIG. 1A shows an illustration of a transmitter and receiver for receiving a reflected ultrasound signal from a user and FIG. 1B shows a gesture detector for a user input according to an embodiment.
Figure 1B:
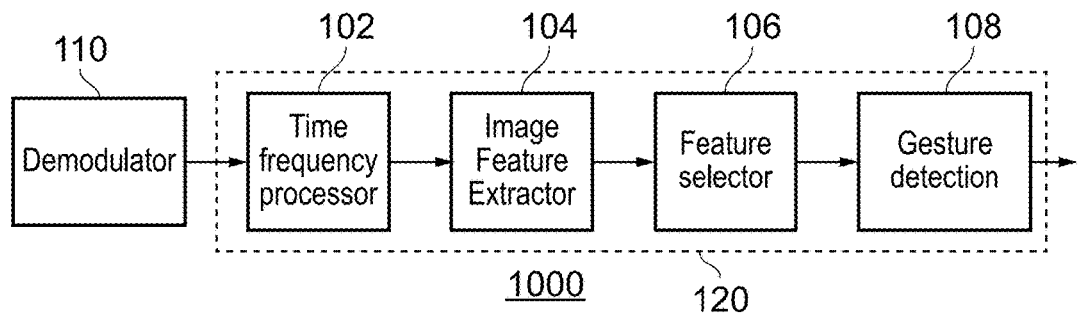

FIG. 1A illustrates the doppler shift due to a target 100 reflecting a transmitted signal from a first transducer 112 back to a receiver having a second transducer 114. For separated transducers the Doppler equation is $$f_d = -\frac{f_s v}{c}(\cos\theta_t + \cos\theta_r) \quad (1)$$

Where c is the speed of sound, $f_d$ is the Doppler frequency shift, $f_s$ is the frequency of the transmitted ultrasound frequency, v is the velocity of the target, $\cos\theta_t$ is the cosine of the angle of the transmitted signal with respect to the target, $\cos\theta_r$ is the cosine of the angle of received signal with respect to the target as illustrated in FIG. 1B. For collocated transducers, the transmitted and reflected angles of incidence are approximately equal i.e. $\theta_\tau = \theta_\rho = \theta$, and equation 1 above may be simplified to:

$$f_d = -\frac{2f_s v}{c}\cos\theta \quad (2)$$

In the case of collocated transducers and approximately a zero-angle incidence, the maximum Doppler velocity for gestures may be typically 3 m/s, and the speed of sound at room temperature is typically 345 m/s. The ratio of Doppler frequencies compared to the transmitted frequency (fd/fs) will typically be in the range of −0.5%<fd/fs<0.5%. In this case the bandwidth of interest around the transmitted tone may be very small, typically less than 1 KHz. The Doppler shift frequencies caused by user gestures may be processed at lower frequencies thereby reducing the power consumption.

FIG. 1B shows a gesture detector 1000. An ultrasound signal may be transmitted by a co-located ultrasound transmitter (not shown). A reflected ultrasound signal may be received by a demodulator 110. The output of the demodulator 110 may be connected to a time frequency processor 102. The output of the time frequency processor 102 may be connected to an image feature extractor 104. An output of the image feature extractor 104 may be connected to feature selector 106. An output of feature selector 106 may be connected to a gesture detection module 108. The time frequency processor 102, image feature extractor 104, feature selector 106 and gesture detection module 108 may be a gesture processor 120.

In operation the demodulator 110 may demodulate the ultrasound signal. The demodulated signal may contain low frequency information of for example less than 1 KHz, which may be due to user gestures and reject the higher frequency signals. By demodulating the signal, the rest of the processing may be performed at much lower frequency which may reduce power consumption. The demodulated ultrasound signal may be processed by the time frequency processor 102 which generates a frequency spectra using FFT or other related algorithms. By generating and comparing time varying signal spectra, more complex gestures may be identified than a comparison based on the signal spectrum at a particular point in time.

The micro-doppler feature extraction module 104 may generate a large set of features from, the time varying signal spectra. These features may include for example peak location, peak amplitude and the shape of the Doppler introduced frequency leakage. The shape of the Doppler leakage may refer for example to the 3 dimensional shape of the signal spectra having an x axis of time, a y axis of frequency and z axis of amplitude. The features generated by the micro-doppler feature extractor 104 may be selected and compressed by single value and principle component analysis and slicing. The skilled person will also appreciate other image feature selection and compression techniques may be used. The selected and compressed micro-doppler feature set may reduce the complexity of the subsequent gesture detection step while still enabling the detection of complex gestures. Typical complex gestures may include but are not limited to: flipping hands in various patterns, waving hands in various patterns and moving fingers in various patterns. A simple gesture may be an up or down movement. The gesture detection module 108 may determine the gesture using for example a machine learning model such as a support vector machine (SVM), a nearest neighbour model, or a decision tree. The skilled person will appreciate that other machine learning models may be used. The output of the gesture detection module 108 may be a user command for a mobile device.

The gesture detector 1000 may detect complex user input gestures at a relatively low average power consumption which may be for example less than a milliwatt. Peak power consumption may be less than 5 milliwatts. When incorporated into a mobile device such as a smartphone or a wearable device, the gesture detector 1000 may be incorporated into a user interface which detects gestures from a user of the mobile device and initiates user commands depending on the detected gestures The components of the gesture detector 1000 may be implemented in hardware, software or a combination of hardware and software. For example the demodulator 110 may be implemented as a hardware or a software switch operating at the frequency of the transmitted tone, which may be for example a frequency of greater than 20 KHz. Typically frequencies of 24 KHz, 32 KHz or 40 KHz may be used. The gesture detection processor 120 may be implemented as logic hardware or as software running on a digital signal processor.

Figure 2:
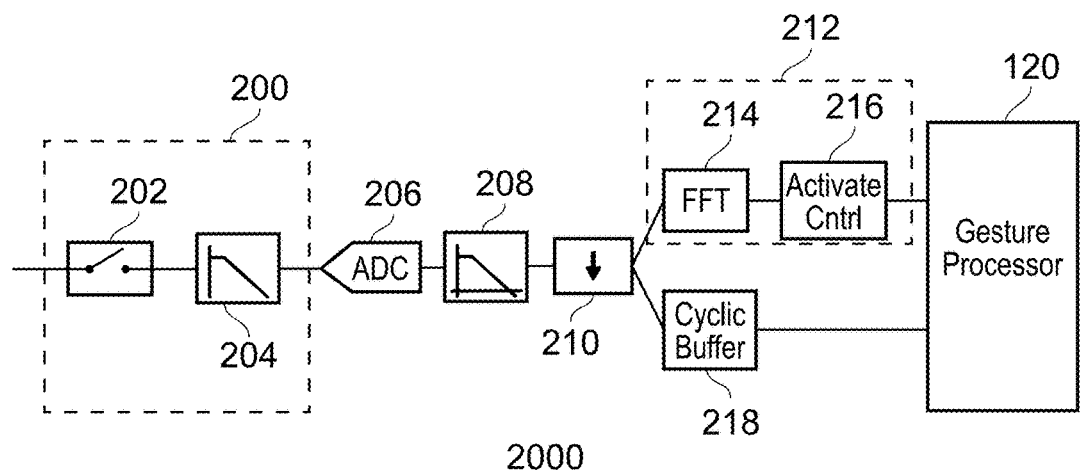
FIG. 2 illustrates a detector for a user input according to an embodiment.

FIG. 2 shows a gesture detector 2000. An ultrasound signal input which may contain gesture information may be received by the demodulator 200. The demodulator 200 may have a low power passive switch 202 which may consume power of a few microwatts. The low power passive switch 202 may be switched at a frequency of greater than 20 KHz, typically 24 KHz, 32 KHz or 40 KHz, depending on the transmitted tone. The output of the low power passive switch 202 which may be connected to a low pass filter 204. The low-pass filter 200 for may be a low order filter such for example a first or second order filter. The bandwidth of the output of the demodulator 200 may be in the range of 2 kHz to 8 kHz. The output of the demodulator 200 may be connected to an analog to digital converter 206. The analog to digital converter 206 may sample the output of the demodulator at a sample frequency of greater than 4 KHz. The digital output of the analog to digital converter may be connected to a further low pass filter 208 which may be a cascaded integrator-comb (CIC) filter. The output of the further low pass filter 208 may be connected to a down-sampler 210. The down-sampler 210 may down sample the signal and reduce bandwidth from for example 8 kHz, to a frequency of less than 1 kHz. The output of the down-sampler 210 may be connected to an activation module 212. The activation module 212 may consist of a fast Fourier transform (FFT) module 214 which may for example be an eight point fast Fourier transform operating at the frequency of less than 0.1 kHz. Alternatively the fast Fourier transform module may implement a 16 point or a 32 point FFT. The activation module 212 may consist of a activate control module 216 connected to the output of the fast Fourier transform module 214. The output of the down-sampler 210 may be connected to a cyclic buffer 218. The output of the cyclic buffer 218 may be connected to gesture processor 120.

In operation, the gesture detector 2000 may be in a first mode of operation whereby the gesture processor 120 is disabled. An ultrasound signal may be received by demodulator 200 and demodulated and filtered by the passive switch 202 and the low-pass filter 204. The demodulated signal may be digitised by analog to digital converter 206 and then further low-pass filtered by the further low-pass filter 208. The digitised signal is then down sampled by the down-sampler 210. The down sampled signal is converted to the frequency domain by FFT 214. The activate control module 216 may then determine whether or not the input signal contains gesture information and activate or enable the gesture processor 120 if a candidate gesture is detected. A candidate gesture may be present in the signal if the side bands of the received input signal have strong energy levels. The term strong energy level may be considered to refer to signal energy or amplitudes which is greater than 10% of the energy or amplitude of the transmitted tone. The side bands of the received input signal may correspond to the demodulated signal. The cyclic buffer 218 may temporarily store the down sampled data while the activation module 212 determine if a candidate gesture has been detected. If a candidate gesture has not been detected, then the data in the buffer will be overwritten and not processed further. If a candidate gesture has been detected then the data in the buffer may be processed by the gesture processor 120. By only activating the gesture processor 120 when a candidate gesture has been detected, the power consumption of the gesture detector 2000 may be reduced.

FIG. 3 shows a gesture detector 3000. A digitized ultrasound signal input which may contain gesture information may be received by the demodulator 300. The demodulator 300 may have a relatively low power switch 302 which may be a software switch that consumes less than 1 milliwatt. The low power switch 302 may be switched at a frequency of greater than 20 KHz, for example 24 KHz, 32 KHz or 40 KHz, depending on the originally transmitted ultrasound tone frequency. The output of the low power switch 302 may be connected to a low-pass filter 304. The low-pass filter 304 may be a low order filter such as, for example, a first or second order filter. The bandwidth of the output of the demodulator 300 may be in the range of 2 to 8 kHz. The output of the demodulator 300 may be connected to a down-sampler 306.

The down-sampler 306 may down-sample the signal and reduce bandwidth from, for example 8 kHz, to a frequency of less than 1 kHz. The output of the down-sampler 306 may be connected to an activation module 312. The activation module 312 may consist of a fast Fourier transform module 310 which may be an eight point fast Fourier transform operating at the frequency of less than 0.1 kHz. Alternatively the fast Fourier transform module may implement a 16 point or a 32 point FFT. The activation module 312 may consist of a activate control module 314 connected to the output of the fast Fourier transform module 310. The output of the down-sampler 306 may be connected to a cyclic buffer 308. The output of the cyclic buffer 308 may be connected to gesture processor 120. The gesture detector 3000 may be implemented as software modules executable on a digital signal processor.

In operation, the gesture detector 3000 may be in a first mode of operation whereby the gesture processor 120 is disabled. A digitized ultrasound signal may be received by demodulator 200 and demodulated and filtered by the passive switch 302 and the low-pass filter 304. The demodulated signal may be down sampled by the down-sampler 306. The down-sampled signal may be converted to the frequency domain by FFT 310. The activate control module 314 may then determine whether or not the input signal contains candidate gesture information. Candidate gesture information may be determined, for example, by comparing the energy level or amplitude of the demodulated signal, which corresponds to sidebands of the digitized ultrasound signal, with the energy level or amplitude of the transmitted tone.

A candidate gesture may be identified if the amplitude of the demodulated signal is above a predetermined threshold. The predetermined threshold value may be for example a value greater than 10% of the amplitude or energy of a transmitted ultrasound tone. The gesture processor 120 may be activated or enabled if a candidate gesture is detected. The cyclic buffer 308 may temporarily store the down sampled data while the activation module 312 determines whether a candidate gesture has been detected. If a candidate gesture has not been detected, then the data in the buffer will be overwritten and not processed further. If a candidate gesture has been detected then the data in the buffer may be processed by the gesture processor 120

FIGS. 4A, B, C and D show examples of time varying frequency spectra for different gestures 4000 which may be detected by a gesture detector 1000, 2000 or 3000. In these figures, x-axis denotes time and y-axis denotes frequency. The image intensity at a particular coordinate (x, y) may denotes the energy level of frequency y at time x. The time varying frequency spectra 4000 may be considered as a two dimensional representation of the 3 dimensional Doppler leakage shape. Doppler frequencies above the dashed reference line 402 may indicate a frequency shift in a positive direction which may be a shift in a direction toward the gesture detector 2000. Doppler frequencies below the dashed reference line 402 may indicate a frequency shift in a negative direction, corresponding to a shift away from the gesture detector 2000.

FIG. 4A shows an example response 400 caused by a hand first approaching the gesture detector 2000, followed by leaving the gesture detector 2000. The spectra response shape 400 consists of mainly positive Doppler frequencies as the hand or target moves towards the gesture detector 2000 with a positive frequency peak 404. As the hand or target moves away from the gesture detector 2000, the response consists of mainly negative Doppler frequencies with a negative peak frequency 406

FIG. 4B shows the response 410 over time to a user performing a swiping gesture. Initially the response shape 410 consists of mainly positive Doppler frequencies with a peak 412 followed by mainly negative shift frequencies with a negative peak 414. The response shape 410 then consists of mainly a further set of positive Doppler frequencies with a further peak 416 followed by a further set of mainly negative Doppler frequencies with a further negative peak 418.

FIG. 4C shows the response shape 420 resulting from a user performing a hand flipping gesture. The response shows similar amounts of positive and negative Doppler frequencies at the same points in time with a positive peak 422 and negative peak 424.

FIG. 4D shows the response 430 resulting from a user gesture where the user's hand first leaves the gesture detector 2000 and then approaches the gesture detector 2000.

The spectra response shape 430 consists of mainly negative Doppler frequencies as the hand or target moves away from the gesture detector 2000 with a negative frequency peak 434 followed by mainly positive Doppler frequencies with a positive peak frequency 432 as the hand or target moves towards the gesture detector 2000.

The skilled person will appreciate that other gestures may have different spectra with characteristic shape features which may be stored and compared with the spectra of a received ultrasound signal to determine the type of user gesture.

Figure 5:
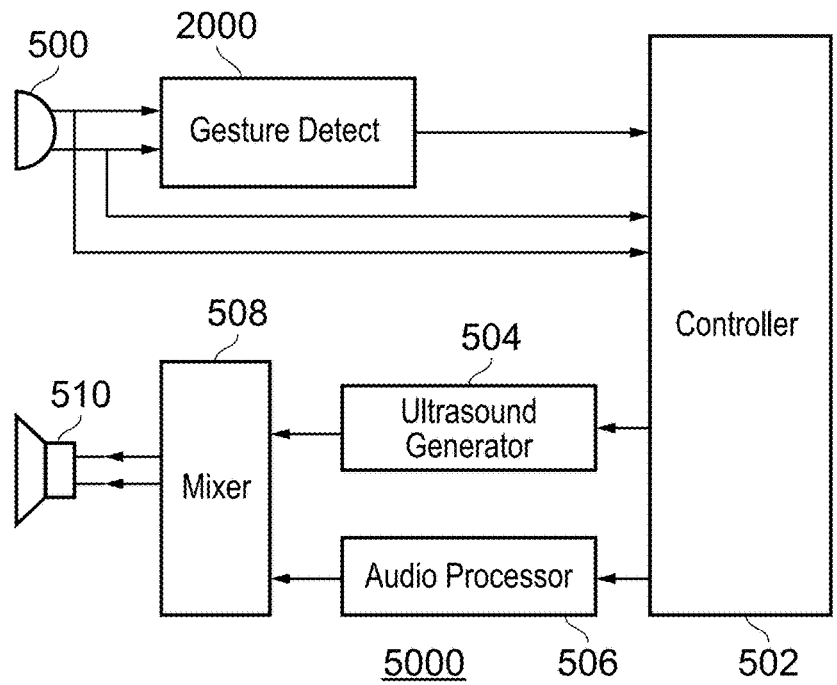
FIG. 5 shows a mobile device according to an embodiment.

FIG. 5 shows a mobile phone 5000 including the gesture detector 2000. A microphone 500 may be connected to the gesture detector 2000. An output of the gesture detector 2000 may be connected to a controller 502. The microphone 500 may be connected directly to the controller 502. An output of the controller 502 may be connected to an ultrasound transmitter 504. The output of audio processor 506 may be connected to a mixer 508.

An output of the controller may be connected to an audio processor 506. The output of ultrasound generator 504 may be connected to a mixer 508. The output of the mixer 508 may be connected to a loudspeaker 510. In operation the ultrasound generator 504 may generate an ultrasound signal which may be transmitted by the loudspeaker 510 via the mixer 508. The ultrasound signal may be a continuous tone or may be a pulse. The frequency of the ultrasound signal may be 20 KHz or greater.

The reflected ultrasound signal may be detected by the microphone 500 and the response of the microphone to the reflected signal may be received by the gesture detector 2000. The gesture detector 2000 may process the received ultrasound signal to determine whether or not a user input gesture has been detected. If a user gesture has been detected by the gesture detector 2000, the gesture detector may output data indicating which gesture has been detected to the controller 502. The detected gesture data may processed by the controller 502 to trigger a user command.

The controller 502 may process the detected user input command and process a detected user input command to initiate various actions of the mobile device. Example commands may be to unlock/lock the device, to increase or decrease volume, to take a picture using a camera feature of the mobile phone 5000 (not shown)

The microphone 500 may also detect speech or other audio inputs and route those directly to the controller 502. The loudspeaker 510 may also output speech or other audio content from the controller 502 which may be processed by the audio processor 506 and mixed with any ultrasound signal generated by the ultrasound generator 504. The loudspeaker 510 and microphone 500 may be used for gesture detection and in normal operation, for example making or receiving phone calls or for playing music. The gesture detection may operate concurrently with other modes of operation of the mobile phone 5000.

Figure 6:
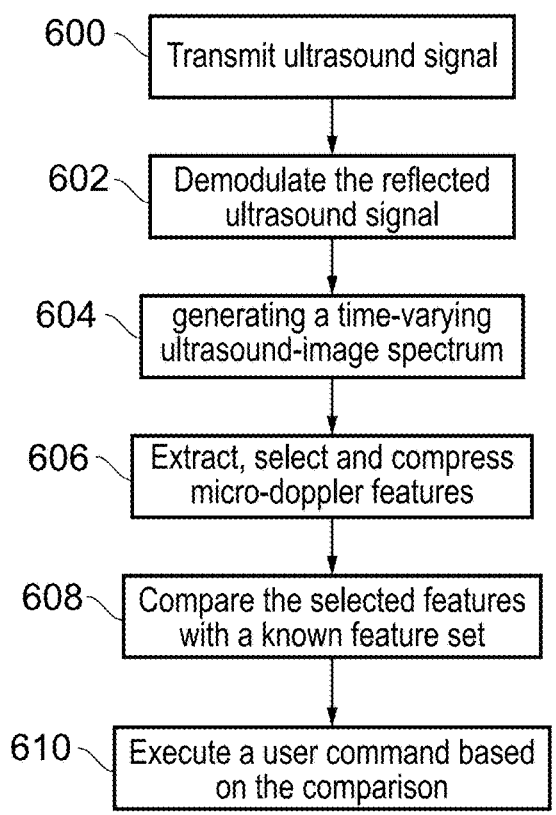
FIG. 6 illustrates a method of operating a mobile device according to an embodiment.

FIG. 6 shows a method of operating a mobile device 6000. In step 600 an ultrasound signal may be transmitted from the mobile device. The transmitted ultrasound signal may be reflected from a target which may be, for example, the hand of the user of the mobile device. The reflected ultrasound signal may be demodulated in step 602. The demodulator signal may be processed to generate a time varying ultrasound image spectrum in step 604. In step 606 Micro Doppler features from the time varying ultrasound image spectrum may be extracted.

A selection of the micro-doppler features may also be made, and these features may be compressed. The features may be selected and compressed by for example by single value and principle component analysis and slicing. In step 608 and the selective Micro Doppler features which may be compressed may be compared with features from a known feature set.

The selected image features may correspond to features extracted from a number of predetermined gestures such as for example a hand clap, a hand moving towards or away from the mobile device, a swiping motion, a waving motion or some other predetermined type of gesture. From the comparison with the known feature set, a determination of a user gesture may be made and in step 610 a user command may be executed by the mobile device in response to the comparison in step 608.

The method 6000 may enable the control of a mobile device by analysis of a user hand gesture without touching the mobile device. The method 6000 may allow the control of a mobile device such as a mobile phone using components of the mobile device such as a loudspeaker to transmit the ultrasound signal in step 600, and the microphone to receive the reflected ultrasound signal in step 602. These components may be shared with other functions of the mobile device.

Herein is described a user input detector for a mobile device, the user input detector having an ultrasound demodulator with an input for receiving an ultrasound signal reflected from a user and an output for outputting a demodulated ultrasound signal; a gesture processor comprising: a time-frequency processing module configured to generate a time-varying ultrasound-image spectrum from the demodulated ultrasound signal; an image-feature extraction module configured to extract micro-doppler features from the time-varying ultrasound image spectrum; a feature selection module configured to select and compress the extracted micro-doppler features; and a gesture detection module configured to compare the selected micro-doppler features with a known feature set and to output a detected gesture based on the comparison. The user input detector may be incorporated into a mobile phone for example to provide an always on low power control mechanism for the mobile phone by recognizing user gestures and executing control commands in response to those user gestures.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A detector for a user input to a mobile device, the detector comprising:
   an ultrasound demodulator having an input for receiving an ultrasound signal reflected from a user and an output for outputting a demodulated ultrasound signal, wherein the ultrasound demodulator comprises a switch arranged between the input of the ultrasound demodulator and the output of the ultrasound demodulator and wherein the ultrasound demodulator is operable to switchably couple the ultrasound signal to the output of the ultrasound demodulator;
   a gesture processor comprising:
   a time-frequency processing module configured to generate a time-varying ultrasound-image spectrum from the demodulated ultrasound signal;
   an image-feature extraction module configured to extract micro-doppler features from the time-varying ultrasound image spectrum;
   a feature selection module configured to select and compress the extracted micro-doppler features; and
   a gesture detection module configured to compare the selected micro-doppler features with a known feature set and to output a detected gesture based on the comparison, wherein the gesture processor comprises logic hardware or software running on a digital signal processor.

2. The detector of claim 1 wherein the ultrasound demodulator further comprises a low-pass filter arranged between the switch and the output of the ultrasound demodulator.

3. The detector of claim 2 further comprising a down-sampler coupled to the output of the ultrasound demodulator.

4. The detector of claim 1 further comprising a cyclic buffer arranged between the output of the ultrasound demodulator and the gesture processor.

5. The detector of claim 3 further comprising a FFT module arranged between the down-sampler and the gesture processor.

6. The detector of claim 1 further comprising an activation controller arranged between the ultrasound demodulator and the gesture detection module, wherein the activation controller is operable to determine a candidate gesture by comparing the demodulated ultrasound signal with a predetermined threshold value, and to enable the gesture processor in response to the candidate gesture.

7. The mobile device of claim 1 wherein the mobile device comprises the detector and is configured to execute a user command in response to the detected gesture.

8. The mobile device of claim 7 further comprising a speaker coupled to an ultrasound signal generator and a microphone coupled to the detector.

9. The mobile device of claim 7 comprising one of a mobile phone, a tablet computer, and a wearable device.

10. A method of controlling a mobile device, the method comprising:
    transmitting an ultrasound signal;
    demodulating a reflected ultrasound signal from a user, wherein demodulating the reflected ultrasound signal comprises switching the reflected ultrasound signal;
    generating a time-varying ultrasound-image spectrum from the demodulated ultrasound signal;
    extracting micro-doppler features from the time-varying ultrasound image spectrum;
    selecting and compressing the extracted micro-doppler features;
    comparing the selected micro-doppler features with a known feature set; and
    outputting the detected gesture based on the comparison.

11. The method of claim 10 wherein demodulating the reflected ultrasound signal further comprises low-pass filtering the reflected ultrasound signal.

12. The method of claim 11 further comprising generating a time-varying ultrasound-image spectrum only when a candidate gesture had been detected.

13. The method of claim 10 comprising down-sampling the reflected ultrasound signal.

14. A detector for a user input to a mobile device, the detector comprising:
- an ultrasound demodulator having an input for receiving an ultrasound signal reflected from a user and an output for outputting a demodulated ultrasound signal;
- a gesture processor comprising:
- a time-frequency processing module configured to generate a time-varying ultrasound-image spectrum from the demodulated ultrasound signal;
- an image-feature extraction module configured to extract micro-doppler features from the time-varying ultrasound image spectrum;
- a feature selection module configured to select and compress the extracted micro-doppler features;
- a gesture detection module configured to compare the selected micro-doppler features with a known feature set and to output a detected gesture based on the comparison; and
- a cyclic buffer arranged between the output of the ultrasound demodulator and the gesture processor, wherein the gesture processor comprises logic hardware or software running on a digital signal processor.

* * * * *